United States Patent [19]

Abe

[11] Patent Number: 4,949,037
[45] Date of Patent: Aug. 14, 1990

[54] SYSTEM FOR DETECTING METAL IN ARTICLES USING PHASE CHANGE OF DETECTION SIGNALS

[75] Inventor: Takashi Abe, Atsugi, Japan

[73] Assignee: Anritsu Corporation, Tokyo, Japan

[21] Appl. No.: 233,272

[22] Filed: Aug. 17, 1988

[30] Foreign Application Priority Data

Aug. 25, 1987 [JP] Japan .................................. 62-212407

[51] Int. Cl.⁵ ...................... G01N 27/72; G01R 33/12
[52] U.S. Cl. .................................. 324/233; 324/225; 324/239
[58] Field of Search ............... 324/225, 233, 239, 241, 324/242, 243, 326, 329; 340/939, 941, 551, 572; 209/567, 570

[56] References Cited

U.S. PATENT DOCUMENTS

| | | | |
|---|---|---|---|
| 4,325,027 | 4/1982 | Dykstra et al. ...................... | 324/329 |
| 4,651,094 | 3/1987 | Wallace ............................... | 324/233 |
| 4,677,384 | 6/1987 | Payne .................................. | 324/233 |

*Primary Examiner*—Gerard R. Strecker
*Assistant Examiner*—Walter E. Snow
*Attorney, Agent, or Firm*—Frishauf, Holtz, Goodman & Woodward

[57] ABSTRACT

In a system for detecting stray metal in an article, the article passes through an alternating magnetic field generated from a coil. The magnetic field is detected by coils which generate induced voltages and the difference between the induced voltages is applied to a tuning and phase-shift circuit. An output signal having a phase, generated from the tuning and phase-shift circuit, is detected by a detector and the peak level of the detected output signal is held in a peak hold and comparing circuit. A plurality of the peak levels are stored in a memory circuit and are processed by a CPU to determine the preferred phase of the output signal. The tuning and phase-shift circuit is so switched as to apply the preferred phase to the output signal.

18 Claims, 12 Drawing Sheets

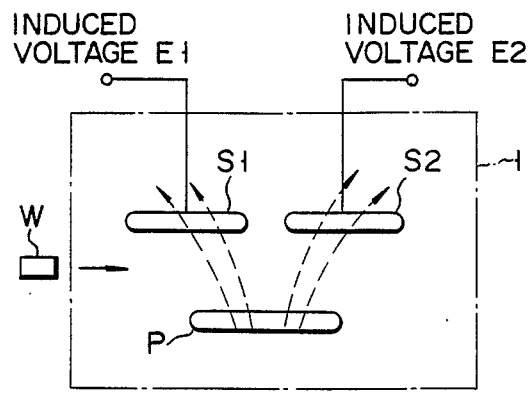
F I G. 1A
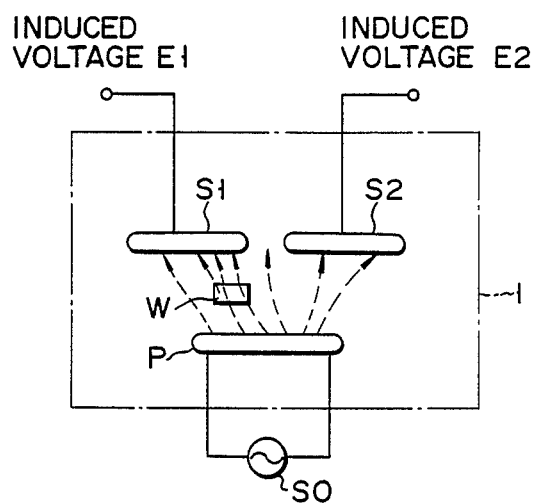
F I G. 1B
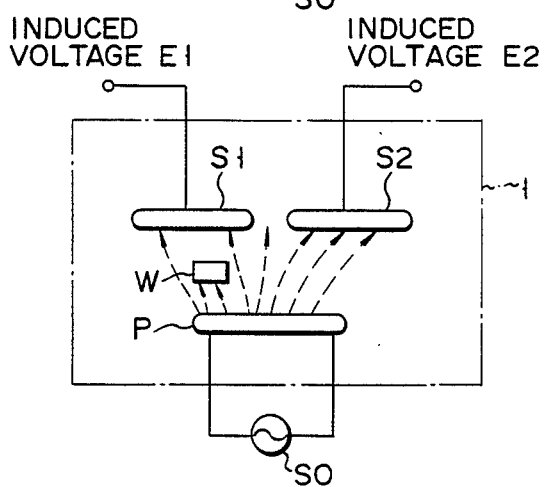
F I G. 1C

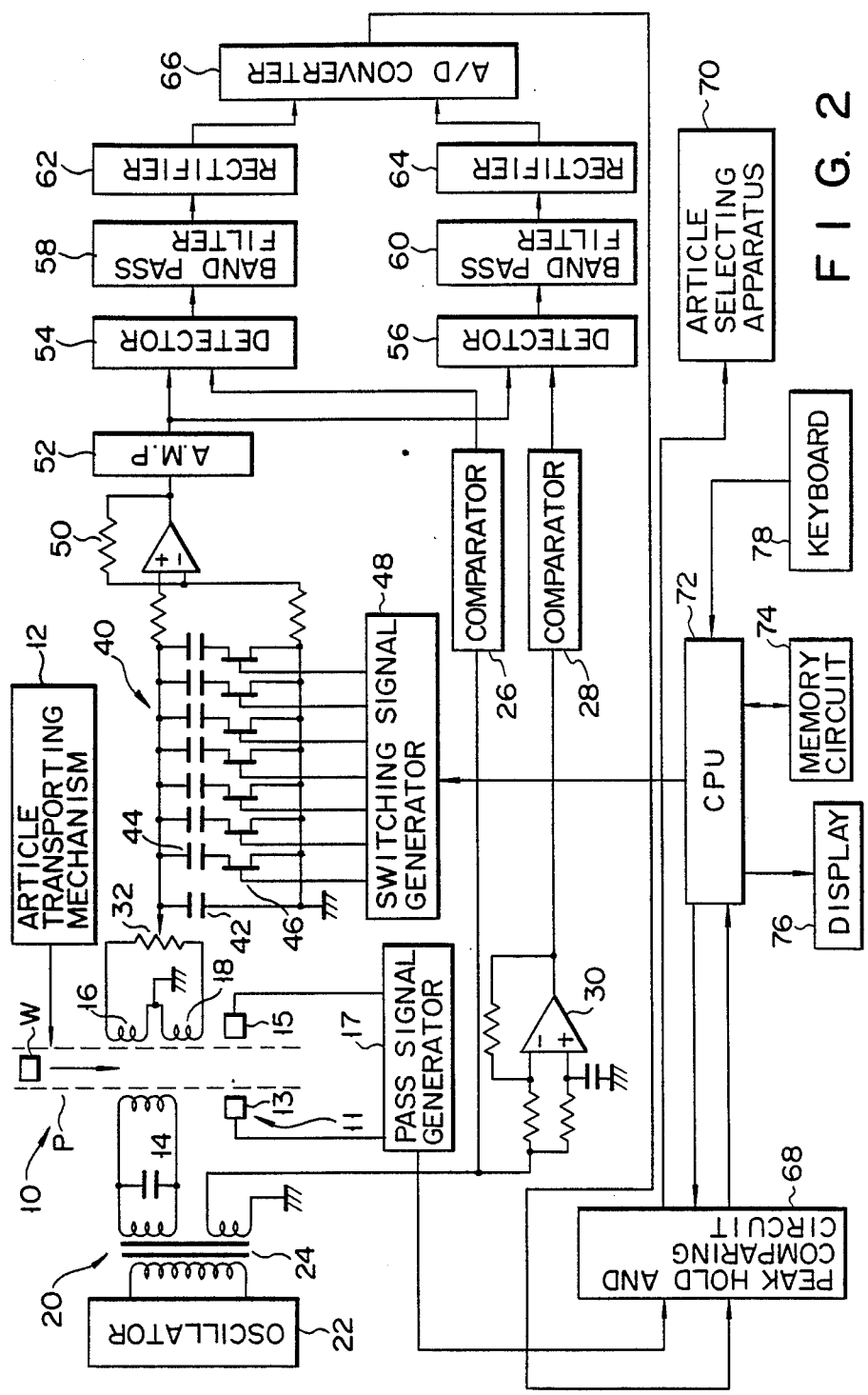

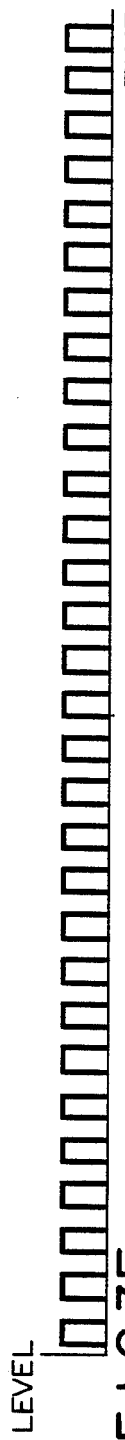
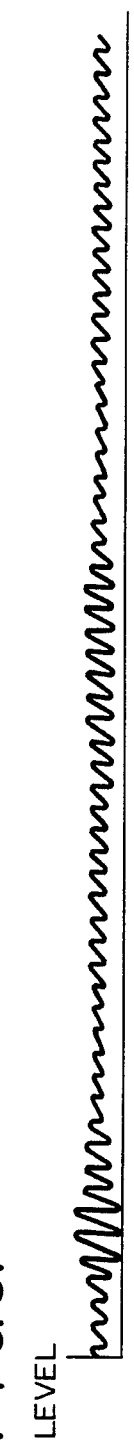
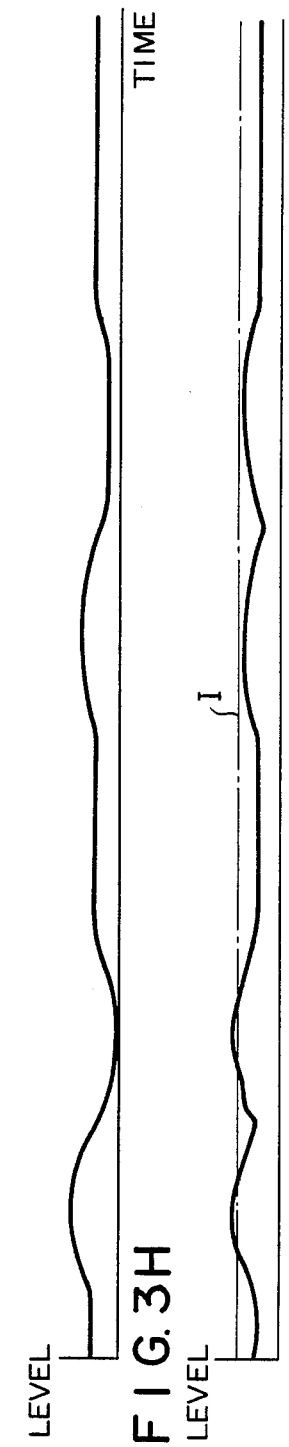
FIG.3E
FIG.3F
FIG.3G
FIG.3H
FIG.3I

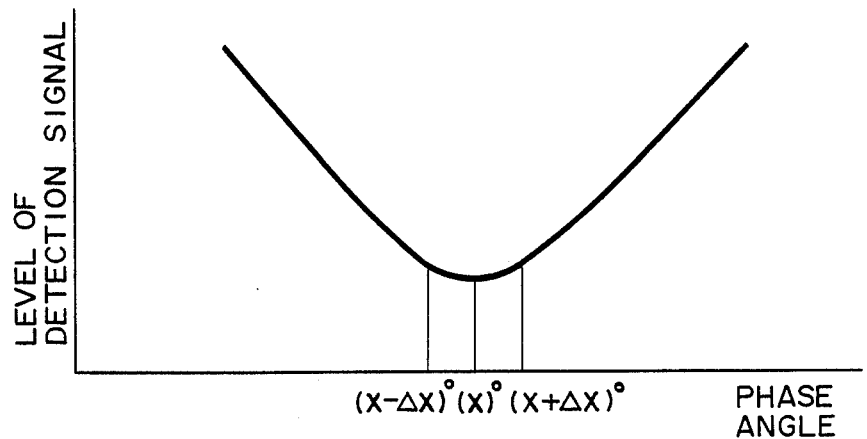
F I G. 4A
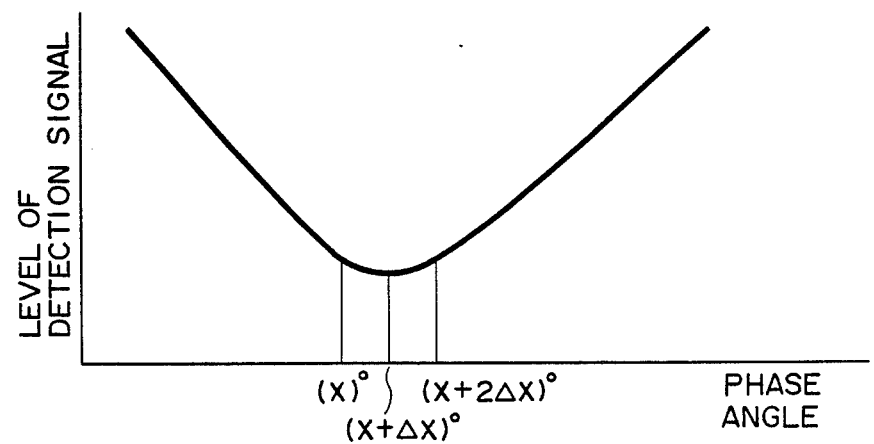
F I G. 4B

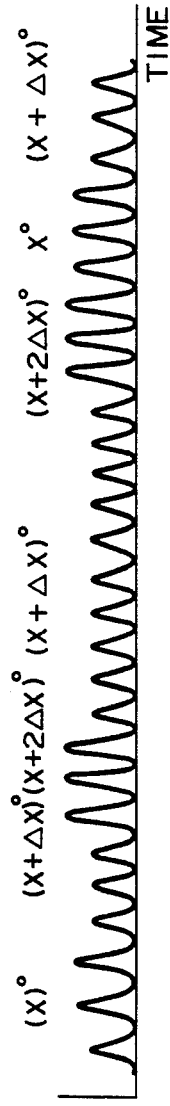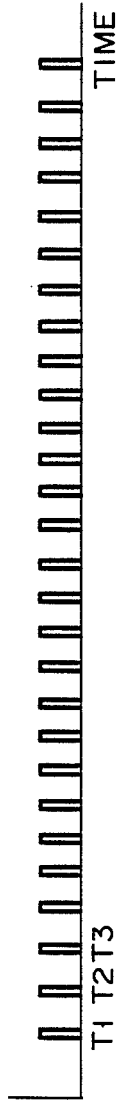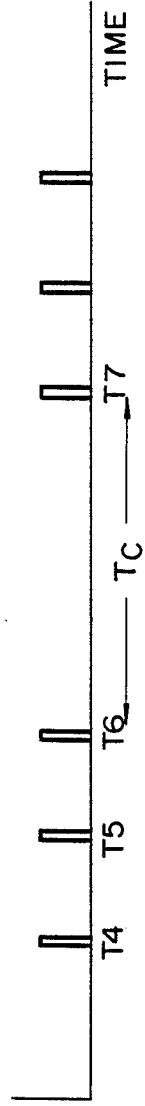
FIG. 6A
FIG. 6B
FIG. 6C
FIG. 6D
FIG. 6E

SYSTEM FOR DETECTING METAL IN ARTICLES USING PHASE CHANGE OF DETECTION SIGNALS

BACKGROUND OF THE INVENTION

1. Field of the Invention

The present invention relates to a system for detecting stray metal in articles to be inspected, and more particularly, to a system capable of securely detecting stray metal in articles despite changes of set conditions, such as changes of contents of the articles to be inspected, change of ambient condition, for example, change of temperature, etc.

2. Description of the Related Art

As is generally known, fine stray metal pieces or particles in articles or products, such as ham, sausage, miso (soybean paste), etc., are detected by the fluoroscopic method, induced voltage method, or variable induction method. In the fluoroscopic method, stray metal in articles is detected by means of soft X-rays or a radioisotope. According to the induced voltage method, an article is passed through a DC magnetic field in which a detecting coil is disposed. If a stray piece or pieces of magnetic substance, such as iron, exist in the article, an induced voltage is produced in the detecting coil. According to the variable induction method, an article is passed through an AC magnetic field in which a detecting coil is disposed. If a stray magnetic piece or pieces such as iron piece or pieces or a stray mon-magnetic piece or pieces such as stainless piece or pieces exist in the article, induced voltages generated in a detecting coil changes. Fluoroscopic metal detecting apparatuses are not popularly used because they are expensive and can be applied only limited kinds of objects. Metal detecting apparatuses based on the induced voltage method, on the other hand, cannot detect the non-magnetic piece or pieces at high sensitivity, so that their fields of application are limited. Conventionally, therefore, the variable induction method is popularly used for metal detecting apparatuses.

The metal detecting apparatus based on the variable induction method is based on the following principle of detection. In detecting section 1 of a metal detecting apparatus, as shown in FIG. 1A, an alternating signal is applied from oscillator $S_0$ to magnetic field generating coil P, whereupon an alternating magnetic field is generated by the coil. First and second coils $S_1$ and $S_2$ are arranged facing coil P so that substantially equal lines of magnetic force delivered from coil P pass through coils $S_1$ and $S_2$, whereby substantially equal induced voltages $E_1$ and $E_2$ are generated by the alternating magnetic field. Article W is transported at a predetermined speed, between magnetic field generating coil P and first and second detecting coils $S_1$ and $S_2$, arranged in this manner, by means of a transporting apparatus (not shown). Thus, after it is passed through a magnetic field between coils P and $S_1$, article W is passed through a magnetic field between coils P and $S_2$. If no stray metal is in article W, the magnetic fields between coils P and $S_1$ and between coils P and $S_2$ make substantially no change despite the passage of the article, and substantially equal induced voltages $E_1$ and $E_2$ are generated from first and second detecting coils $S_1$ and $S_2$. If stray metal is in article W, on the other hand, lines of magnetic force of the magnetic fields between coils P and $S_1$ and between coil P and $S_2$ change each time the article passes through the magnetic fields, and different induced voltages $E_1$ and $E_2$ are generated from coils $S_1$ and $S_2$. Thus, if iron, a magnetic substance, exists in article W, the path of the lines of magnetic force passing through first detecting coil $S_1$ is changed by iron, thereby increasing the lines of magnetic force, as the article passes through coil $S_1$. As a result, induced voltage $E_1$ detected by coil $S_1$ increases to a level higher than induced voltage $E_2$ induced by coil $S_2$.

If a nonferrous metal exists in the article, an eddy current is produced in the metal, as shown in FIG. 1C, and electromagnetic flux is consumed as energy to produce the eddy current, so that the lines of magnetic force passing through first detecting coil $S_1$ are reduced. Thereupon, induced voltage $E_1$ induced by coil $S_1$ is reduced to a level lower than induced voltage $E_2$ induced by second detecting coil $S_2$. Thus, if stray metal is in article W, a difference is produced between induced voltages $E_1$ and $E_2$ from first and second detecting coils $S_1$ and $S_2$ while the article is passing through detecting section 1. A differential voltage equivalent to the difference between the two induced voltages is delivered as an unbalance signal, and the stray metal in the article can be detected by detecting the unbalance signal.

In the metal detecting apparatus described above, if the material or ingredients of the article, the ambient temperature, or the inductances of first and second detecting coils $S_1$ and $S_2$ change, the set conditions vary, so that the sensitivity of the apparatus is lowered. Thus, stray metal cannot be accurately detected.

SUMMARY OF THE INVENTION

The object of the present invention is to provide a metal detecting system which can automatically maintain its best sensitivity without adjustment, despite changes of set conditions, including the ambient, so that its metal detecting capability can be prevented from lowering.

According to the present invention, there is provided a system for detecting stray metal in an article, which comprises: means for generating an alternating magnetic field and applying the magnetic field to the article; means for detecting the generated magnetic field and delivering a detection signal of a first phase; means for changing the phase of the detection signal from the first phase to a second phase; means for comparing the detection signal with a first reference level, thereby determining whether stray metal is in the article; and means for collecting detection signals of the first and second phases whose levels are not higher than the first reference level, comparing the detection signals to determine an optimum phase out of the two phases, and actuating the means for changing the phase, thereby maintaining the optimum phase for the detection signals.

BRIEF DESCRIPTION OF THE DRAWINGS

FIGS. 1A to 1C are diagrams for illustrating the principle of a system for detecting stray metal in articles, based on the variable induction method;

FIG. 2 is a block diagram showing a system for detecting stray metal in articles according to an embodiment of the invention;

FIGS. 4A and 4B are graphs showing the relationships between a phase set by means of a tuning and phase-shift circuit shown in FIG. 2 and the level of a detection signal obtained when no stray metal is in the article;

FIGS. 6A to 6E are timing charts showing operations of a CPU and a peak hold circuit shown in FIG. 2;

DETAILED DESCRIPTION OF THE PREFERRED EMBODIMENTS

Figure 3A:
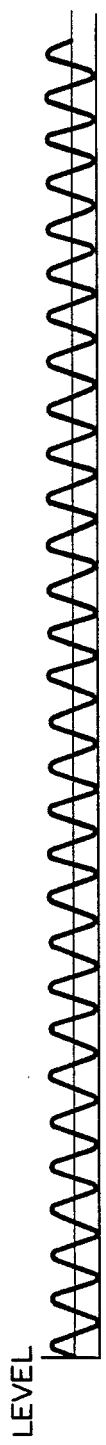
FIGS. 3A to 3N show waveforms of signals for various parts of the block shown in FIG. 2.
Figure 3B:
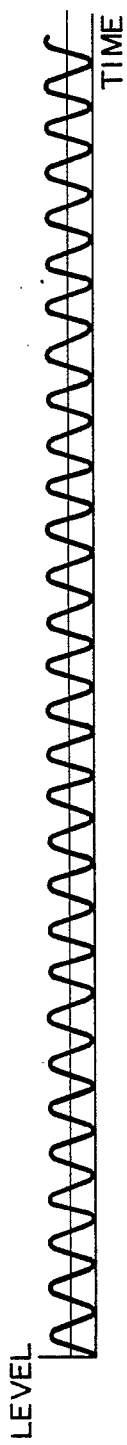
Figure 3C:
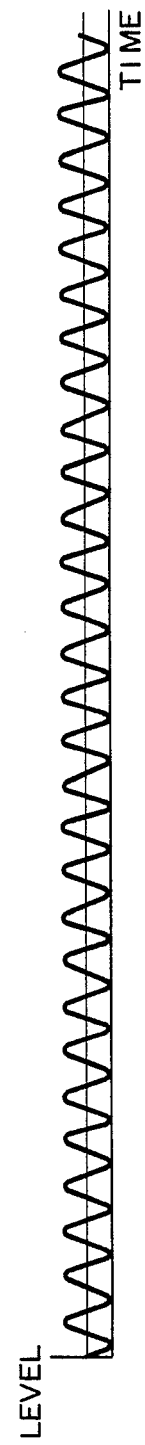

In a system for detecting stray metal in article W according to an embodiment of the present invention shown in FIG. 2, detecting section 10 is provided with article transporting mechanism 12, e.g., a conveyor mechanism, which is used to transport article W along transport path P. An alternating magnetic field is applied from magnetic field generating coil 14 to path P. First and second detecting coils 16 and 18 are arranged facing coil 14. Further provided is article passage detector 11 which detects the passage of article W between coil 14 and coils 16 and 18. Detector 11 is composed, for example, of light emitting diode 13, photodiode 15 opposed thereto across passage P, and passage signal generator 17 connected to these diodes. As article W passes between diodes 13 and 15, it intercepts a light beam emitted from diode 13 toward diode 15, so that a passage signal is generated from generator 17. First and second detecting coils 16 and 18 are arranged so that lines of magnetic force delivered from magnetic field generating coil 14 pass substantially equally through coils 16 and 18 when no article is put between coil 14 and coils 16 and 18. Thus, substantially equal dielectric starting voltages are produced in first and second coils 16 and 18. Field generating coil 14 is connected to reference signal circuit 20 for generating a reference signal, to be excited in response to the reference signal. Circuit 20 is composed of oscillator 22 for generating a sine-wave signal, as shown in FIG. 3A, and transformer 24 whose primary side is connected to the oscillator. One secondary side of transformer 24 is connected to coil 14, while the other second side thereof is connected to comparator 26, and is also connected to comparator 28 through phase shifter 30 which shifts the phase of a sine-wave, for use as the reference signal, through 90°. Both comparators 26 and 28 serve to convert the sin wave into a square wave. In this arrangement, a first reference signal, as shown in FIG. 3B, is supplied to magnetic field generating coil 14 and comparator 26. Phase shifter 30 delivers a second reference signal whose phase is deviated 90° from that of the first reference signal, shown in FIG. 3C, and the second reference signal is supplied to comparator 28. Further, comparators 26 and 28 deliver first and second square-wave signals into which the first and second reference signals are converted, as shown in FIGS. 3E and 3F, respectively.

First and second detecting coils 16 and 18 are connected in series with each other. The junction between them is grounded, and a series circuit of coils 16 and 18 is connected to variable resistor 32. More specifically, coils 16 and 18 are connected in an unbalanced manner, and a differential voltage equivalent to the difference between exciting voltages produced in coils 16 and 18 is generated in the slider of resistor 32. If no stray metal is in article W, substantially equal induced voltages are generated in first and second detecting coils 16 and 18, and a voltage of a substantially zero level is generated in the slider of resistor 32. If any stray metal is in article W, on the other hand, induced voltages of different levels are generated in coils 16 and 18, and a differential voltage of a varying level is generated in the slider of resistor 32.

Figure 3D:
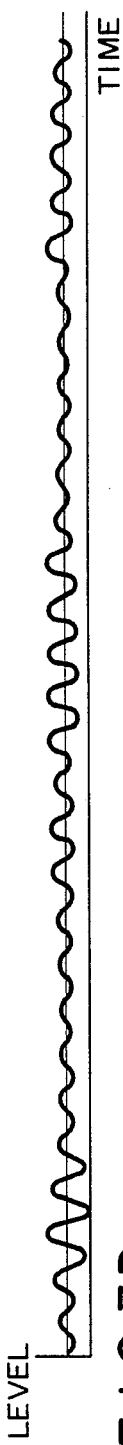

The slider of variable resistor 32 is connected to tuning and phase-shift circuit 40 which is used to select the tuning reactance, especially capacitance, of a tuning circuit including first and second coils 16 and 18. Circuit 40 includes capacitor 42 and a plurality of series circuits each composed of capacitor 44 and switching element 46 and connected in parallel with capacitor 42. Capacitors 44 have different capacitances, and the respective gates of switching elements 46, e.g., FETs, are connected to switching signal generator 48. Elements 46 are caused to conduct when they receive a switching signal from generator 48, and one of capacitors 44, connected to elements 46, is selected as tuning capacitor 44. Thus, tuning and phase-shift circuit 40 delivers a detection signal which has a frequency component synchronous with an impedance set by means of generator 48, as shown in FIG. 3D.

Figure 3J:
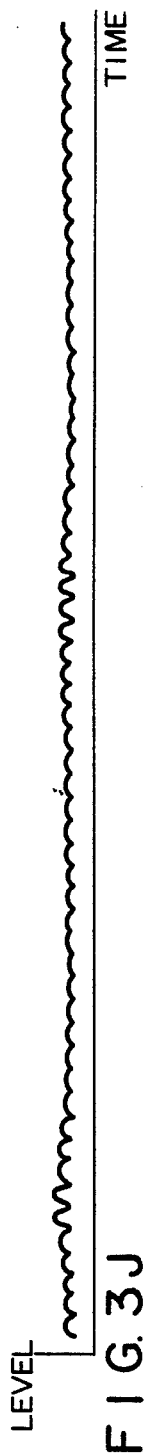
Figure 3K:
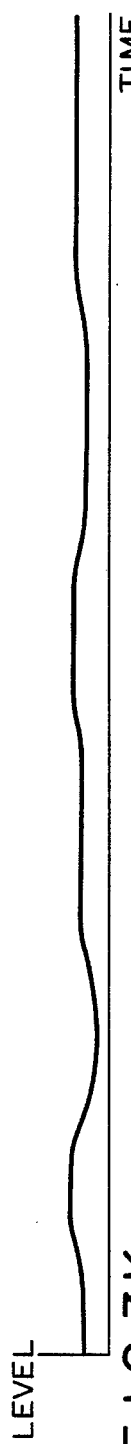
Figure 3L:
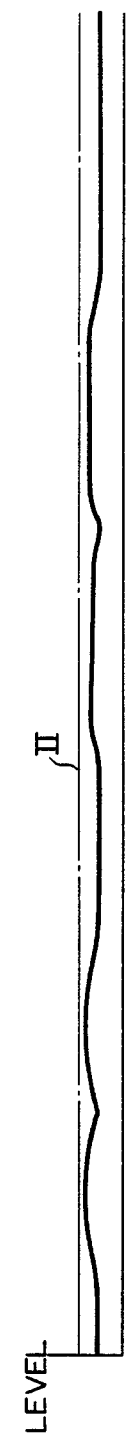

Tuning and phase-shift circuit 40 is connected to amplifier 52 through impedance converter 50. Amplifier 52 is connected to first and second synchronous detectors 54 and 56, which are connected to first and second rectifiers 62 and 64 through band-pass filters 58 and 60, respectively. The detection signal from circuit 40, as shown in FIG. 3D, is amplified by amplifier 52, and is detected in synchronous detectors 54 and 56 by means of the first and second square-wave signals from first and second comparators 26 and 28, as shown in FIGS. 3E and 3F. The detected first and second demodulation signals, as shown in FIGS. 3G and 3J, are filtered by means of band-pass filters 58 and 60, respectively. First and second filter outputs from filters 58 and 60, as shown in FIGS. 3H and 3K, are rectified by means of first and second rectifiers 62 and 64, respectively. Rectifiers 62 and 64 deliver rectifier detection signals, as shown in FIGS. 3I and 3L, respectively.

Figure 3M:
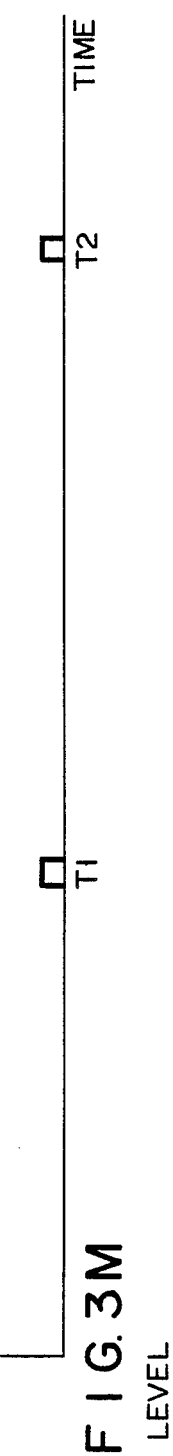
Figure 3N:

First and second rectifiers 62 and 64 are connected to peak hold and comparing circuit 68, through A/D converter 66. Passage signal generator 17 is also connected to circuit 68. Circuit 68 receives a digital detection signal which is continuously delivered from converter 66 during the time interval between time T1, when a certain passage signal, as shown in FIG. 3M, is delivered from generator 17, and time T2, when the next passage signal is delivered. When it detects the peak level of the detection signal, circuit 68 continues to hold it. Each time a passage signal is supplied from passage signal generator 17, the held peak level of the detection signal is compared with a predetermined level, and is then cleared. When the detection signal from A/D converter 66 exceeds the predetermined level indicated by I and II in FIGS. 3I and 3L, a stray metal signal is delivered from peak hold and comparing circuit 68 at time Td a moment after time T1, as shown in FIG. 3N. In response to this stray metal signal, article selecting apparatus 70 is actuated. Accordingly, an article transported past article detector 11 is rejected, as a metal-affected defective, from transport path P, and CPU 72 causes display 76 to indicate the presence of stray metal in the article. If no stray metal is in the article, the peak detection signal, held in peak hold and comparing circuit 68 during the detection of each article, is caused to be stored in memory circuit 74 by CPU 72.

In the embodiment described above, unless the stray metal in article W, detected by detecting section 10, is a magnetic substance, such as iron, no phase delay, as compared with the reference signal, is caused in detecting coils 16 and 18 of section 10. Therefore, detection is performed in first synchronous detector 54 by means of the first square-wave signal of the same phase as the reference signal, as shown in FIG. 3E, from first comparator 26. If the stray metal in article W, detected by detecting section 10, is iron or other magnetic substance, on the other hand, a phase delay, as compared with the reference signal, is caused in detecting coils 16 and 18 of section 10. Therefore, detection is performed in second synchronous detector 56 by means of the second square-wave signal from second comparator 28, whose phase is delayed 90° behind that of the reference signal, as shown in FIG. 3F. Thus, if stray metal, whether magnetic or nonmagnetic, is in the article, it can be detected by means of the system shown in FIG. 2.

The following is a description of automatic phase adjustment for the operation of switching signal generator 48.

In the system shown in FIG. 2, whether stray metal is in the article can be detected with the best sensitivity when capacitor 44 with the best capacitance, in tuning and phase-shift circuit 40, is selected. Thus, if a proper one of capacitors 44 of circuit 40 is selected by means of the switching signal from switching signal generator 48, despite changes of the ambient temperature, or the material or ingredients of the article, detecting coils 16 and 18 can be tuned with high sensitivity to magnetic field generating coil 14, opposed to coils 16 and 18, and the field generating side including the metal in the article. Accordingly, the level of the detection signal, obtained when stray metal is in the article, can be increased, so that the stray metal can be securely detected.

In tuning and phase-shift circuit 40 shown in FIG. 2, when one capacitor 44 is replaced with another so that the capacitance changes, the reactance or impedance of circuit 40 changes. If the impedance changes, then the phase of the detection signal from circuit 40 changes. Thus, the change of capacitor 44 selected results in the change of the phase of the detection signal, and tuning and phase-shift circuit 40 can be defined as a circuit which shifts the phase of the detection signal.

If the phase or phase angle of the detection signal is adjusted to an optimum value in accordance with the material or ingredients of the article and the ambient temperature, detecting section 11 is operated with the maximum sensitivity, as shown in FIGS. 4A and 4B, and stray metal in the article can be securely detected. FIGS. 4A and 4B show influences of the phase angle on the detection signal, that is, the relationships between the phase angle and the level of the detection signal obtained when no stray metal is in the article. The detection signal generated when no stray metal is in the article can be handled as a noise in detecting the presence of stray metal. Accordingly, if the signal levels shown in FIGS. 4A and 4B increase, then the detecting capability or sensitivity is lowered. Thus, phase angles $(x)°$ and $(x+\Delta x)°$ are phase angles which correspond to the maximum sensitivity in FIGS. 4A and 4B, respectively. As seen from the comparison between FIGS. 4A and 4B, the phase angle of the detection signal corresponding to the maximum sensitivity is changed according to the material of the article or ingredients and the ambient temperature. The system shown in FIG. 2 is subjected to automatic phase adjustment such that it can enjoy the maximum sensitivity depending on the material or ingredients and the ambient temperature.

Figure 5:
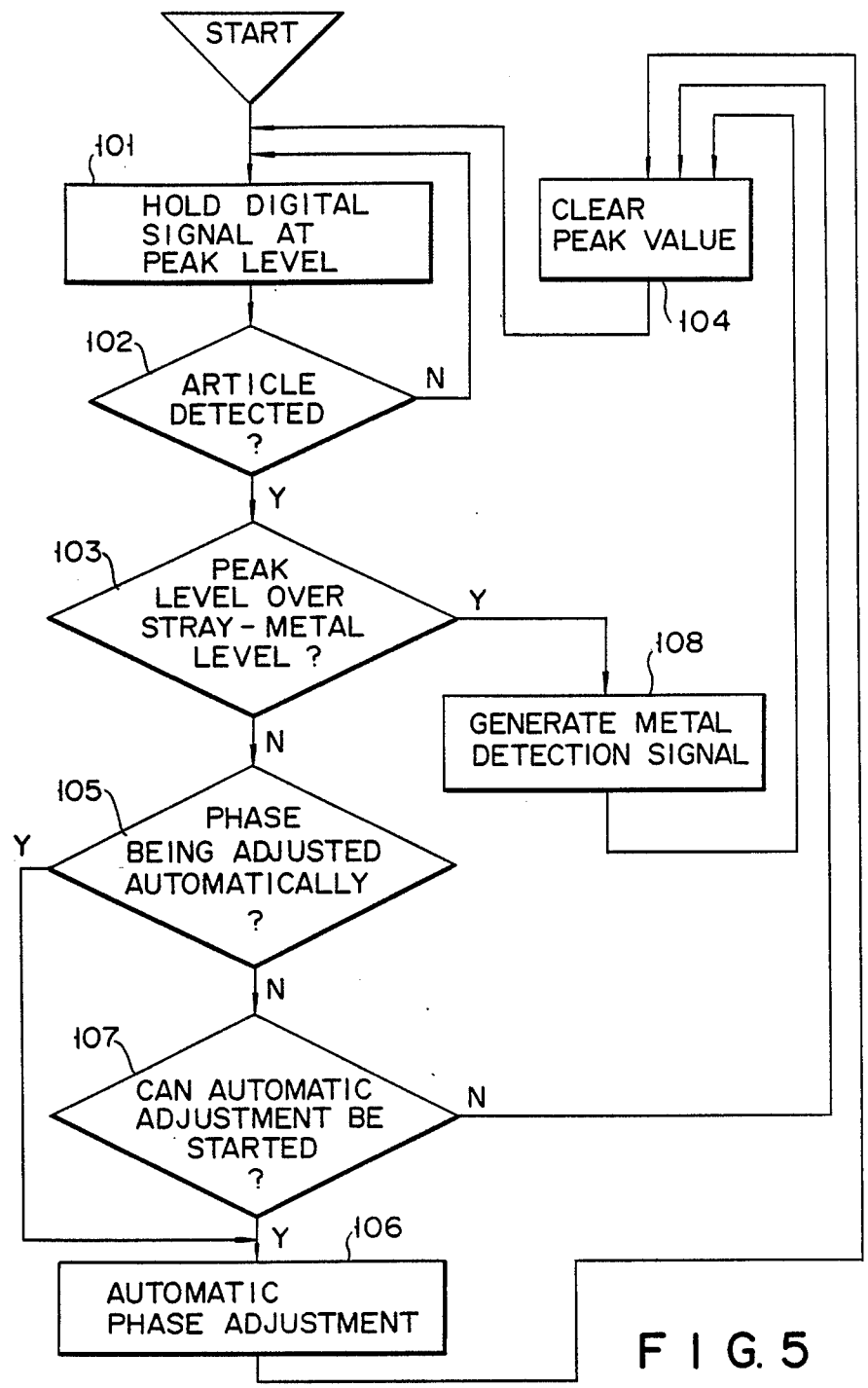
FIG. 5 is a flow chart showing an operation routine of the system shown in FIG. 2.

In the operation routine for metal detection, as mentioned before, the peak value of the digital signal from A/D converter 66 is held in peak hold and comparing signal circuit 68 in step 101, as shown in the flow chart of FIG. 5. If the passage of the article through article passage detector 11 is not detected in step 102, the peak value continues to be updated in circuit 68. If the passage through detector 11 is detected, the peak value is compared with a predetermined stray metal level by circuit 68 in step 103. If stray metal is in article W, a metal detection signal is delivered from peak hold and comparing circuit 68 in step 108, the peak value held in circuit 68 is cleared in step 104, and another peak value is held again in circuit 68. If no stray metal is in article W, whether CPU 72 is performing the operation for the automatic phase adjustment is determined in step 105. If the execution of this operation is detected, it is continued without any change in step 106. If CPU 72 is not found to be in the operation for the automatic phase adjustment, whether the timing for the start of the operation is determined in step 107. Since the ambient temperature or the material or ingredients of the article may possibly have been changed, the automatic phase adjustment is started with every passage of a predetermined time. When the timing for the start of the operation for the adjustment is attained, the operation is started in step 106. When the start timing is not attained yet, the peak value is cleared in step 104.

In the operation for the automatic phase adjustment, one capacitor 44 or phase angle $(x)°$ is first selected corresponding to the article, ambient angle, etc., by means of keyboard 78 shown in FIG. 2. Then, the timing for the start of the automatic phase adjustment and other conditions are inputted and stored as initial set conditions in memory circuit 74. Thereafter, the aforementioned operation for defect inspection is started, and an automatic phase adjustment start signal is delivered at time T0, as shown FIG. 6, so that the operation for the automatic phase adjustment is started. Thereupon, a signal from one of rectifiers 62 and 64 is supplied to peak hold and comparing circuit 68 and its peak level signal shown in FIG. 6A is held in peak hold and comparing circuit 68. If no stray metal is in the article, the peak signal is delivered from circuit 68 through CPU 72 to memory circuit 74, to be stored therein as data for first mode (x), each time a passage signal is delivered from passage signal generator 17 at time T1, T2 or T3, as shown in FIG. 6B.

When the inspection of a predetermined number of articles, e.g., three articles, as shown in FIG. 6B, is completed, CPU 72 instructs switching signal generator 48 to select capacitor 44 such that the detection signal has phase angle $(x+\Delta x)°$. At time T4, a switching signal is delivered from generator 48. As a result, the detection signal with phase angle $(x+\Delta x)°$ is generated, and its peak levels are stored successively as data for second mode $(x+\Delta x)$ in memory circuit 74. At time T5, moreover, capacitor 44 is selected such that the detection signal has phase angle $(x+2\Delta x)°$ or $(x-\Delta x)°$. Thus, the detection signal with phase angle $(x+2\Delta x)°$ or $(x-\Delta x)°$ is generated, and its peak levels are stored successively as data for third mode (x+2Δx) or (x−Δx) in memory circuit 74.

After the peak data for first, second, and third modes (x), (x+Δx), and (x+2Δx) or (x−Δx) are collected, phase angle (x+Δx)° corresponding to the minimum value of the least influenced detection signal, generated when no stray signal is in the article, as shown in FIG. 4B, is obtained by comparative calculation. Thereafter, an automatic phase adjustment end signal is generated at time Tp, as shown in FIG. 6E, whereupon the operation for the automatic phase adjustment is finished. At time T6, a switching signal to select specific capacitor 44 such that the detection signal with phase angle (x+Δx)° is generated is delivered. During predetermined time interval Tc between times T6 and T7, the metal detecting operation is continued with the selected capacitor used consistently.

Figure 7A:
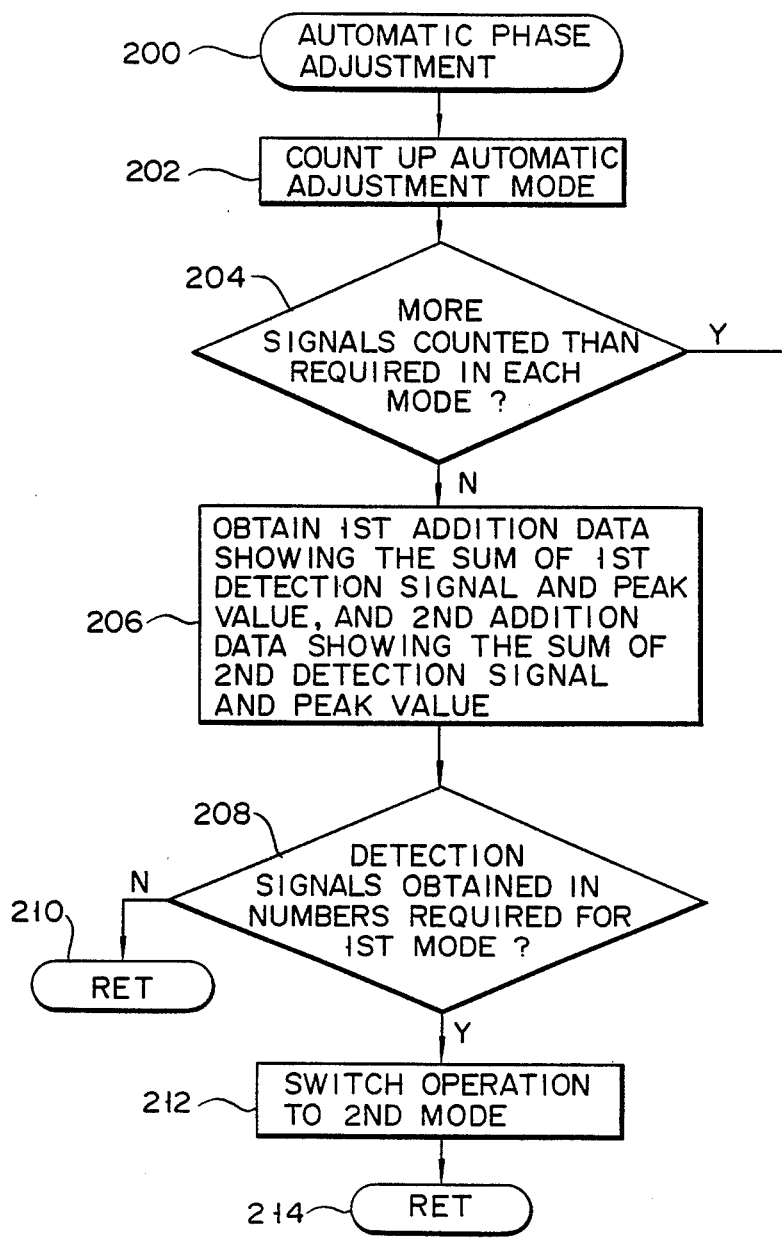
FIGS. 7A to 7C are a flow chart showing a sub-routine for an automatic phase, adjusting operation of the CPU shown in FIG. 2.
Figure 7B:
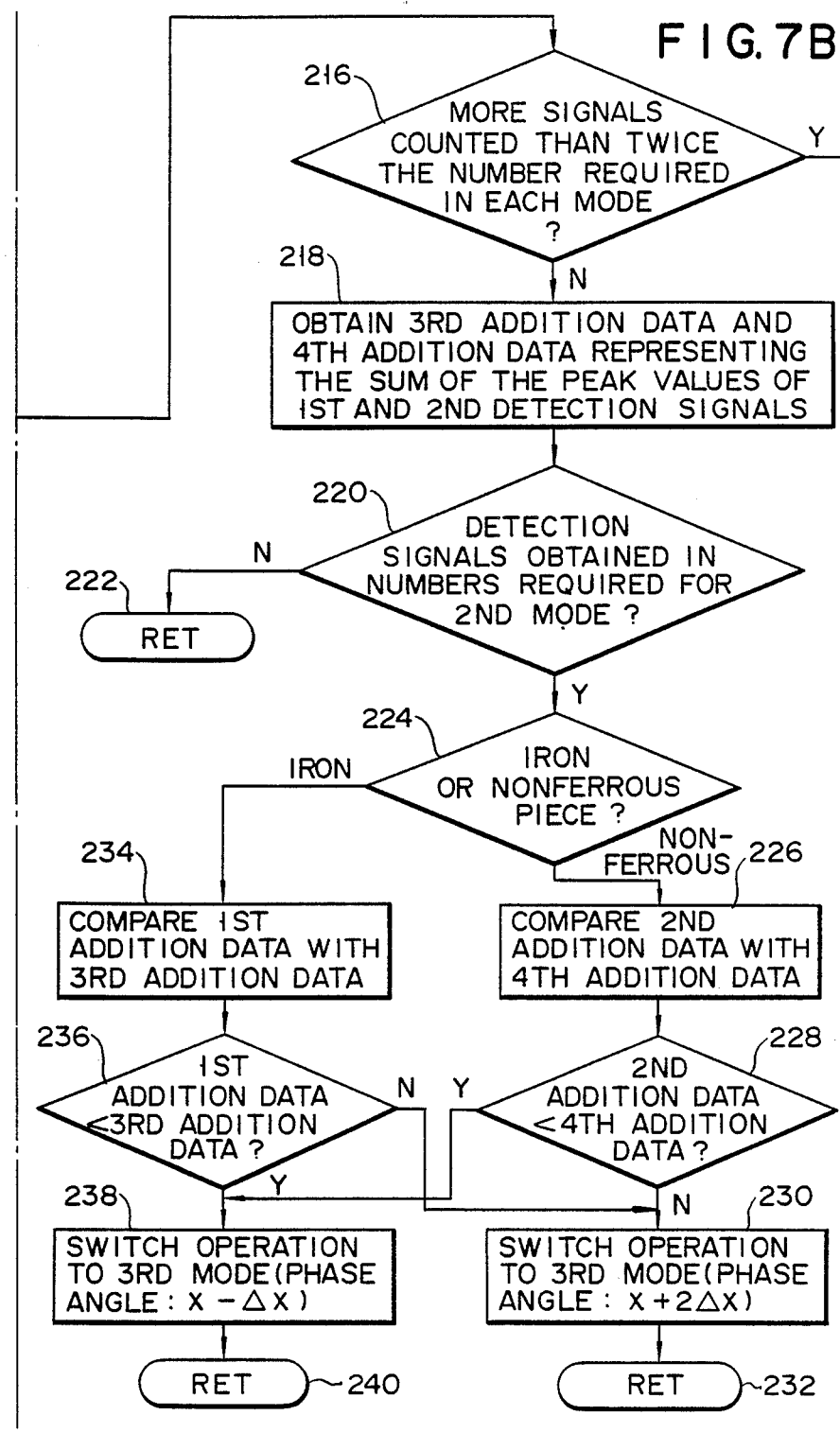
Figure 7C:
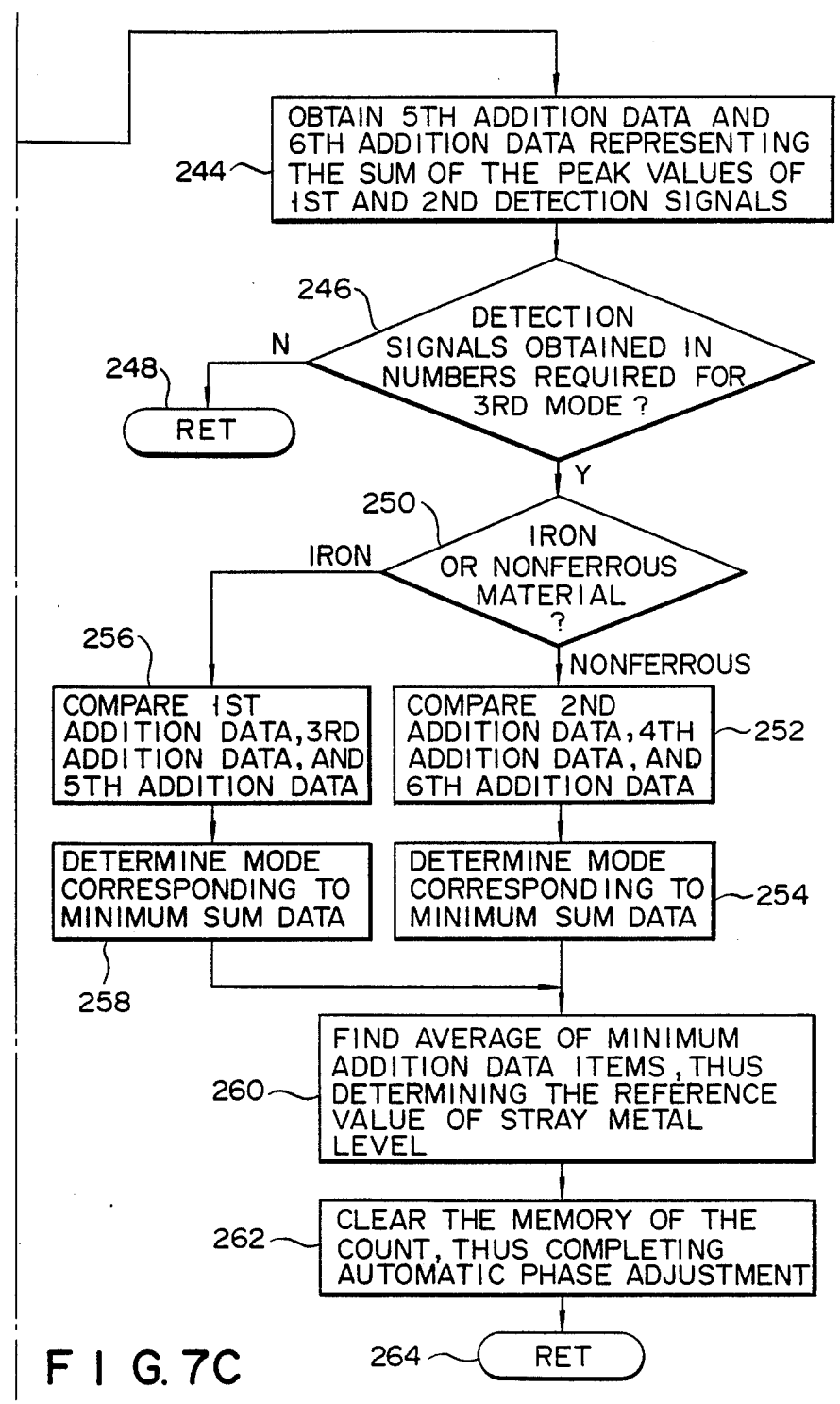

The automatic phase adjustment is executed according to the routine shown in FIG. 7. After the operation for the adjustment is started in step 200, the count for the automatic adjustment mode is upped by 1 to designate a new mode in step 202. In the initial stage, a zero mode is shifted up to designate first mode (x). After first mode (x) is up, it is shifted up to designate second mode (x+Δx). Then, whether the count for detection signals to be detected in each mode is exceeded by the number of detection signals already detected is determined in step 204. More specifically, as previously mentioned with reference to FIGS. 6A to 6E, the number of detection signals to be detected in each mode or for each phase angle is 3, which is compared with the count for detection signals detected and stored in memory circuit 74. In first mode (x), for example, the count stored in circuit 74 is 3 or less, so that the program proceeds from step 204 to step 206. In second mode (x+Δx) or third mode (x+2Δx) or (x−Δx), on the other hand, the count stored in circuit 74 is 3 or more, so that the program proceeds from 204 to 216. In step 206, the peak values of first and second detection signals, obtained when no stray metal as the object of detection, whether magnetic or nonmagnetic, is in the article, are added as first and second addition data, respectively. In step 208, whether the detection signals required in first mode (x), i.e., three first and second detection signals, are obtained is determined. If the required detection signals are not obtained, the operation for the automatic phase adjustment proceeds to the main routine shown in FIG. 5 via step 210. If the required detection signals are obtained, a control signal is delivered from CPU 72 to switching signal generator 48 to cause generator 48 to generate a switching signal, and the mode is switched in step 212. Thereafter, the operation for the automatic phase adjustment returns to the main routine shown in FIG. 5 via step 214.

In first mode (x), the three first and second detection signals are counted and stored in memory circuit 74. In second mode (x+Δx), therefore, the count stored in circuit 74 is three or more, so that the operation for the automatic phase adjustment proceeds from step 204 to step 216. In step 216, whether the count in memory circuit 74 is over twice the number of detection signals to be detected in each mode is determined. In second mode (x+Δx), the count never exceeds this double number, so that the program proceeds to step 218. In third mode (x+2Δx), on the other hand, the count exceeds the double number, so that the program proceeds to step 244.

In step 218, the peak values of the first and second detection signals, obtained when no stray metal is in the article in second mode (x+Δx), are added as third and fourth addition data, respectively. In step 220, whether the detection signals required in second mode (x+Δx), i.e., three first and second detection signals, are obtained is determined. If the required detection signals are not obtained, the operation for the automatic phase adjustment proceeds to the main routine shown in FIG. 5 via step 222. If the required detection signals are obtained, whether the object of detection is iron or nonferrous metal is determined in step 224. The first and third data for iron are compared in step 234, while the second and fourth addition data for nonferrous metal are compared in step 226. In the comparison of the first and third addition data for iron, whether the first addition data of first mode (x) is smaller than the third addition data of second mode (x+Δx) is determined in step 236. Likewise, in the comparison of the second and fourth addition data for nonferrous metal, whether the second addition data of first mode (x) is smaller than the fourth addition data of second mode (x+Δx) is determined in step 228. If the first addition data of first mode (x) is smaller than the third addition data of second mode (x+Δx), or if the second addition data of the first mode is smaller than the fourth addition data of the second mode, (x−Δx)° is selected as the phase angle of the third mode. Thereupon, a control signal is delivered from CPU 72 to switching signal generator 48 so that the detection signals have phase angle (x−Δx)°, and the mode is switched in step 238. Thereafter, the operation for the automatic phase adjustment returns to the main routine shown in FIG. 5 via step 240. If the first addition data of first mode (x) is not smaller than the third addition data of second mode (x+Δx), or if the second addition data of the first mode is not smaller than the fourth addition data of the second mode, (x+2Δx)° is selected as the phase angle of the third mode. Thereupon, a control signal is delivered from CPU 72 to switching signal generator 48 so that the detection signals have phase angle (x+Δx)°, and the mode is switched in step 230. Thereafter, the operation for the automatic phase adjustment returns to the main routine shown in FIG. 5 via step 232.

If it is concluded in step 216 that the count in memory circuit 74 is over twice the number of detection signals to be detected in each mode, and when third mode (x+2Δx) or (x−Δx) is entered, the peak values of the first and second detection signals, obtained when no stray metal is in the article in third mode (x+2Δx) or (x−Δx), are added as the fifth and sixth addition data, respectively, in step 244. In step 246, whether the detection signals required in third mode (x+2Δx) or (x−Δx), i.e., three first and second detection signals, are obtained is determined. If the required detection signals are not obtained, the operation for the automatic phase adjustment proceeds to the main routine shown in FIG. 5 via step 248. If the required detection signals are obtained, whether the object of detection is iron or nonferrous metal is determined in step 250. The first, third, and fifth data for iron are compared in step 256. In step 258, the mode corresponding to the smallest one of the first, third, and fifth addition data for iron is determined, that is, the phase angle is set. Thereupon, a control signal is delivered from CPU 72 to switching signal generator 48 so that the detection signals have the set phase angle, the mode is switched, and the switched mode is maintained for a predetermined period of time. Likewise, the second, fourth, and sixth addition data for nonferrous metal are compared in step 252. In step 254, the mode corresponding to the smallest one of the second, fourth, and sixth addition data for nonferrous metal is determined, that is, the phase angle is set. Thereupon, a control signal is delivered from CPU 72 to switching signal generator 48 so that the detection signals have the set phase angle, the mode is switched, and the switched mode is maintained for a predetermined period of time.

Figure 8:
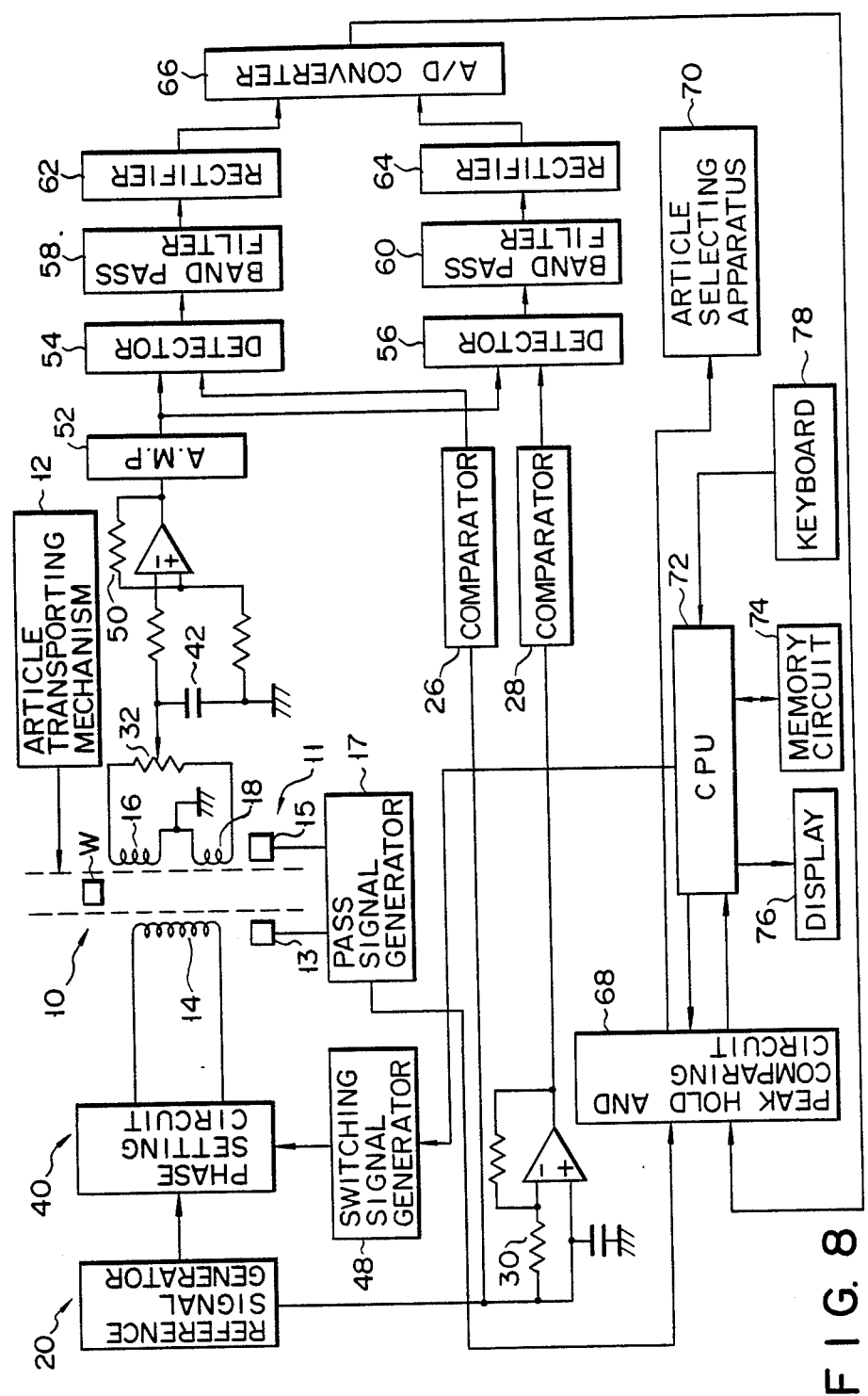
FIG. 8 is a block diagram showing a system for detecting stray metal in articles according to an alternative embodiment of the invention.

In step 260, the smallest or minimum addition data is processed to obtain a mean value, and reference value of the stray metal level is set as many time, for example, two time of the mean value. Thereafter, the detection signal count value in memory circuit 74 is cleared, and preparations for the next cycle of automatic phase adjustment, after the passage of the predetermined time, are made. Also, the operation for the automatic phase adjustment returns to the main routine shown in FIG. 5 via step 263. In the embodiment described above, the automatic phase adjustment is executed in three modes, i.e., the first, second, and third modes. Alternatively, however, another mode for another phase angle may be effected besides. According to the above embodiment, moreover, the peak levels of three detection signals are obtained in each mode. It is to be understood, however, that the peak levels of any number of detection signals may be obtained in each mode. In the second mode, one of the phase angles $(x+\Delta x)$ and $(x-\Delta x)$ to be switched may be determined from the previous automatic phase adjustment operation. In the circuit shown in FIG. 2, furthermore, the capacitance on the detection coil side is selected. Alternatively, however, the phase of the reference signal generated on the signal generator side may be selected, as shown in FIG. 8. In the arrangement of FIG. 8, phase setting circuit 40 for setting the phase of a magnetic field generating current is disposed between magnetic field generating coil 14 and reference signal generator 20, which includes an oscillator. Switching signal generator 48 is actuated in response to a control signal from CPU 72, and a proper capacitance is selected in circuit 40, in accordance with a signal from generator 48. Thus, a magnetic field generating current with a proper phase can be supplied to coil 14. In this case, phase setting circuit 40 is provided on the side of field generating coil 14, so that the tuning and phase-shift circuit need not be provided on the side of detecting coils 16 and 18. The circuit shown in FIG. 8 differs from the one shown in FIG. 2 only in the arrangement of phase setting circuit 40; the former is operated substantially in the same manner as the latter, that is, in the manner described with reference to FIG. 2. In circuit 40 shown in FIG. 2 or 8, the phase of the detection signal is determined by selecting the internal capacitors. It is to be understood, however, inductors, such as coils, may be selected in place of the capacitors so that the inductance can be changed.

According to the system for detecting stray metal in articles according to the present invention, the level of detection signals, obtained when stray metal is in the articles, can be raised relatively to the noise level, despite changes of the ambient temperature or the material or ingredients of the articles. Thus, the system can be adjusted to setting conditions for the highest sensitivity, and can therefore securely detect stray metal, if any, in the articles.

What is claimed is:

1. A system for detecting stray metal in an article, comprising:

means for successively transporting articles to be inspected through a transport path to an inspection section;

means for generating an alternating magnetic field and for applying said alternating magnetic field to the articles which pass through said inspection section and said transport path;

means for detecting the generated alternating magnetic field and for generating a detection signal having a given phase;

means for changing the phase of said detection signal from a first phase to a second phase;

means for comparing said detection signal with a first reference level, for thereby determining whether stray metal is in an article which passes through said inspection station collecting means including means for collecting detection signals of said first and second phases whose levels are not higher than said first reference level, means for comparing said detection signals to determine an optimum phase out of said first and second phases, and means for actuating said means for changing the phase, thereby maintaining the optimum phase for the detection signal.

2. The system according to claim 1, further comprising means for detecting the passage of an article through said magnetic field, and for delivering a passage signal.

3. The system according to claim 1, wherein said means for generating said alternating magnetic field includes means for generating a reference signal, and a magnetic field generating coil adapted to be excited in response to the reference signal.

4. The system according to claim 3, wherein said means for generating said alternating magnetic field further includes means for changing the phase of the reference signal.

5. The system according to claim 3, wherein said means for detecting said magnetic field includes first and second coils disposed in said magnetic field for delivering first and second induced voltage signals induced by said magnetic field.

6. The system according to claim 5, wherein said means for detecting said magnetic field further includes means for delivering a differential voltage equivalent to the difference between the first and second induced voltage signals, as a detection signal.

7. The system according to claim 6, wherein said means for changing said phase of the detection signal from the first phase to the second phase includes means connected to the first and second detecting coils for converting the differential voltage into a detection signal of the first or second phase.

8. The system according to claim 3, wherein said detecting means includes means for detecting said detection signal by means of the reference signal, and for delivering a demodulation signal.

9. The system according to claim 8, wherein said detecting means further includes means for shifting the phase of the reference signal through 90°, and for delivering another demodulation signal by detecting the detection signal by means of the reference signal with the shifted phase.

10. The system according to claim 1, wherein said means for comparing the reference level and the detection signal includes means for holding a peak level of the detection signal.

11. The system according to claim 10, wherein said means for comparing said detection signals of the first and second phases includes means for calculating the peak levels of the detection signals and for updating the reference level for comparison on the basis of the results of said calculation.

12. The system according to claim 1, wherein said means for comparing said detection signals of the first and second phases is operated at a predetermined period.

13. The system according to claim 1, wherein:
said means for changing the phase of said detection signal from said first phase into said second phase includes means for changing said first and second phases into a third phase, and
said collecting means collects detection signals of said first, second, and third phases whose levels are not higher than the first reference level, compares the detection signals to determine an optimum phase out of the three phases, and actuates said means for changing the phase, thereby maintaining the optimum phase for the detection signals.

14. The system according to claim 1, wherein said collecting means includes means for adding a plurality of detection signals of the first and second phases whose levels are not higher than the first reference level to produce first and second sums, compares the resulting first and second sums to determine an optimum phase, and actuates said means for changing the phase, thereby maintaining the optimum phase for the detection signals.

15. The system according to claim 1, wherein said means for comparing said detection signals of the first and second phases is operated after a predetermined number of articles passes through the system.

16. The system according to claim 1, wherein said means for changing the phase of said detection signal comprises a tuning and phase-shift circuit.

17. The system according to claim 16, wherein said tuning and phase-shift circuit comprises a variable capacitance which is variable for changing said phase of said detection signal.

18. The system according to claim 16, wherein said means for changing the phase of said detection signal further comprises a peak level detection means and means for holding the detected peak level.

* * * * *